June 29, 1965  A. H. VAN RIPER  3,192,293
METHOD AND APPARATUS FOR REPROCESSING
PLASTIC WASTE MATERIAL
Filed June 19, 1962  3 Sheets-Sheet 1
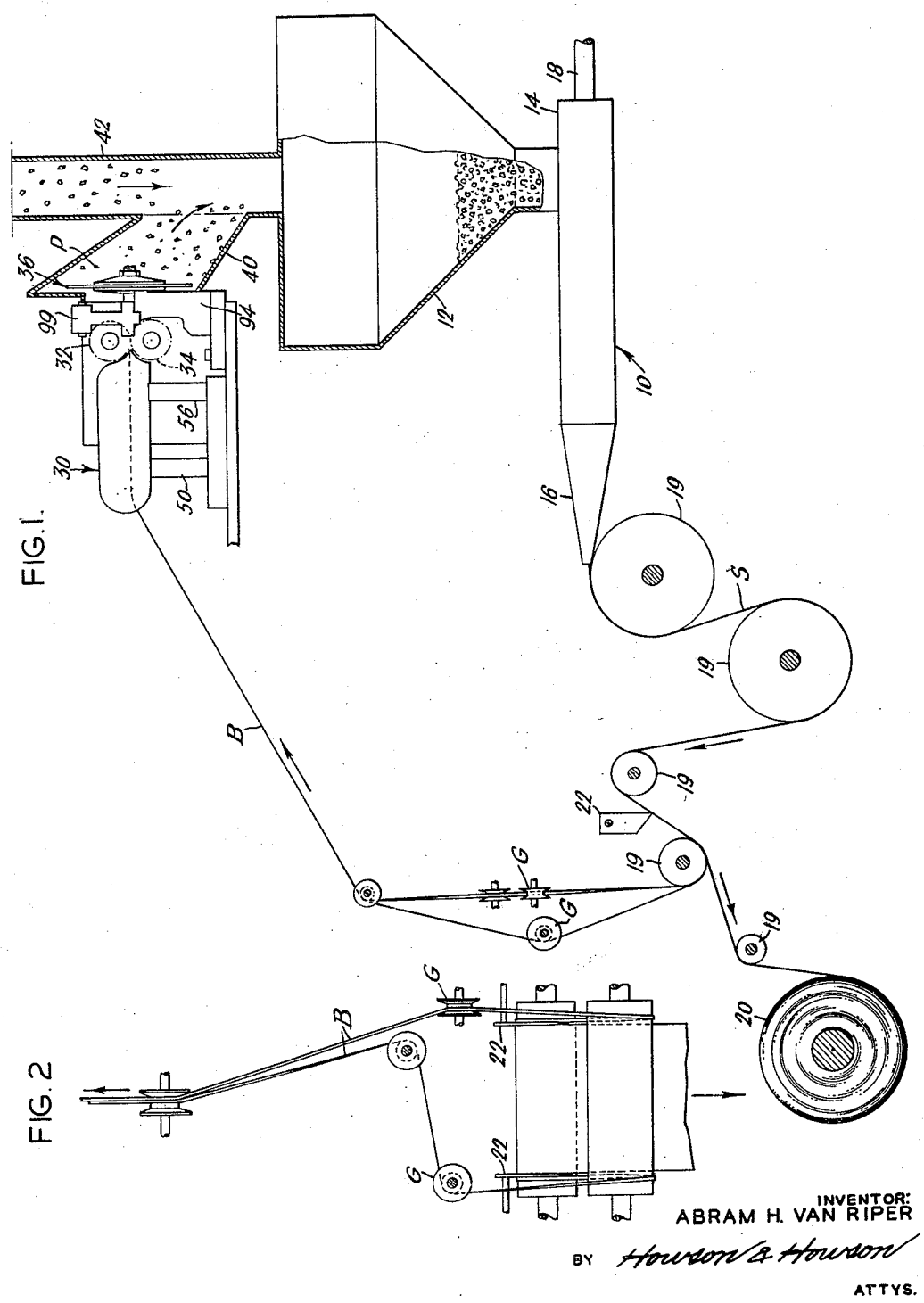
INVENTOR:
ABRAM H. VAN RIPER
BY Howson & Howson
ATTYS.

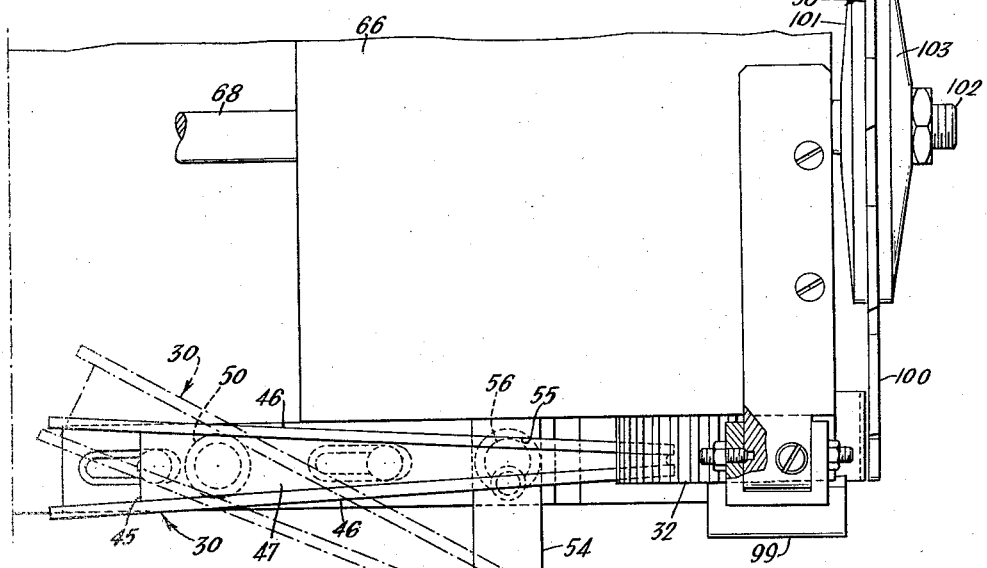
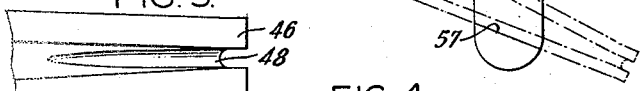
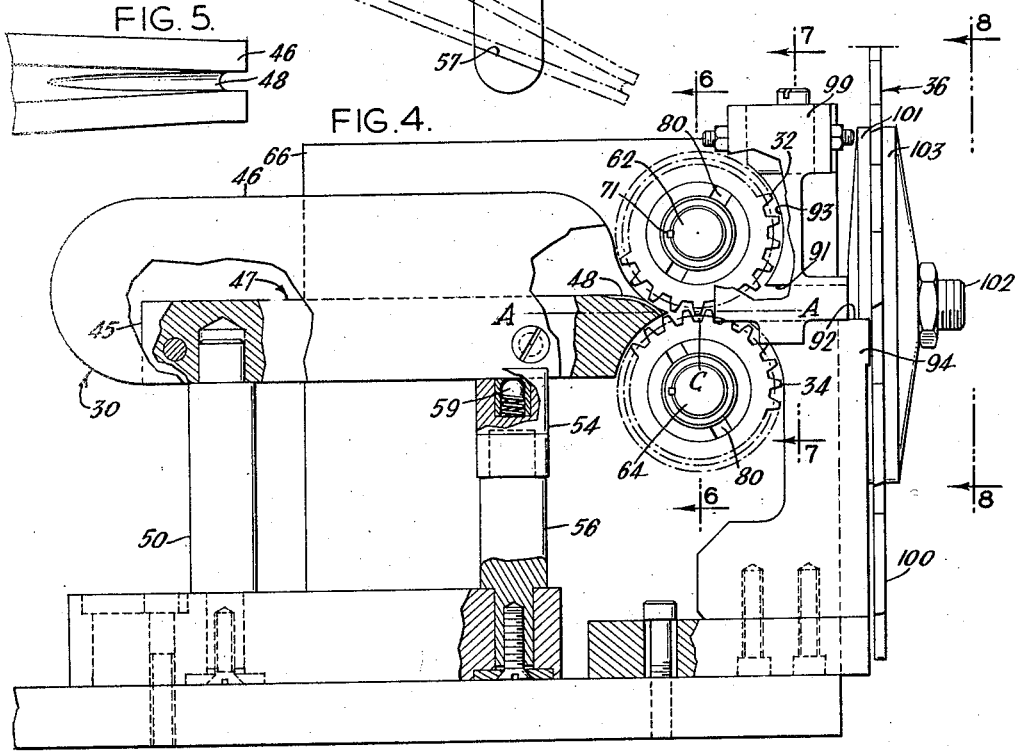

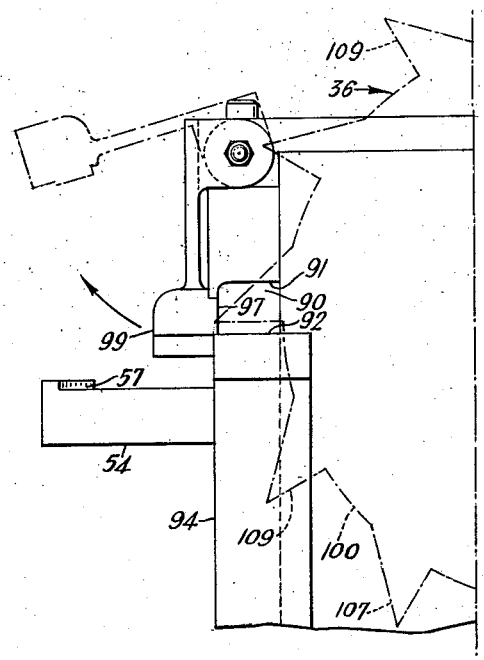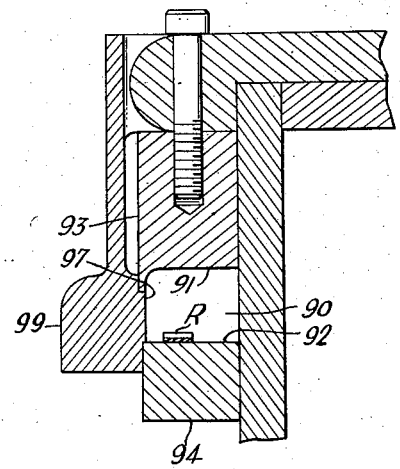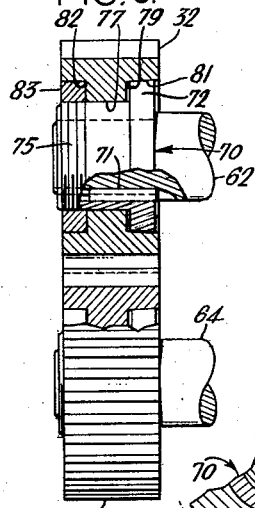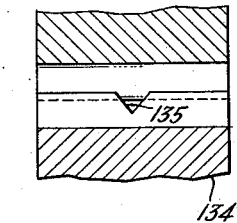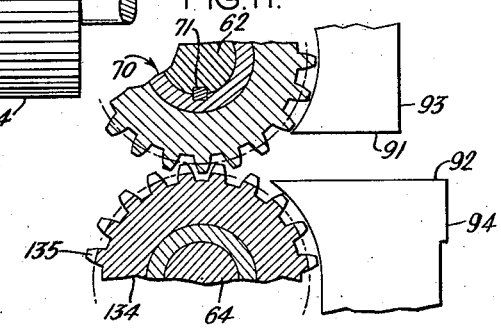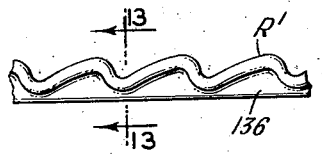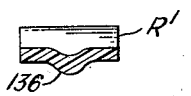

3,192,293
METHOD AND APPARATUS FOR REPROCESSING PLASTIC WASTE MATERIAL
Abram H. Van Riper, R.D. 1, Oley, Pa.
Filed June 19, 1962, Ser. No. 203,617
13 Claims. (Cl. 264—37)

The present invention relates to method and apparatus for reprocessing plastic waste material into a form suitable for reuse in plastic molding apparatus.

The reprocessing method and apparatus of the present invention are especially useful in conjunction with plastic molding apparatus used for making sheet goods, illustrated schematically in FIG. 1 of the drawings. In apparatus of this type, plastic pellets are processed into a continuous sheet and the selvage edges are trimmed or cut to provide a finished sheet. As present, the waste selvages formed by trimming the sheet are usually melted down and molded into new pellets. Since this reprocessing requires melting and molding equipment, the sheet fabricator usually accumulates an amount of the waste selvages and then sends it out periodically to a pellet manufacturer to be reprocessed. Accumulation of the selvage waste in this manner is of course costly due to the handling required and the storage space occupied by the waste material. Further the cost of reprocessed or new pellets far exceeds the return received by the sheet fabricator for the waste material supplied to make the pellets.

Accordingly it is an object of the present invention to provide a new and improved method and apparatus for reprocessing selvage waste formed during making of plastic sheet goods whereby the selvage waste may be reprocessed much more economically than the prior reprocessing process discussed above. In accordance with the present invention, the selvage bands are gathered into an integrated, rope-like strip of closely bunched selvage bands, which strip is then crimped along its length to form a unitary corrugated ribbon. The ribbon is then cut into a plurality of small segments of substantially the same size as standard new pellets used in the sheet molding apparatus, which segments are adapted to be commingled with the new pellets being supplied to the sheet making apparatus. In accordance with the present invention, the selvage bands may be reprocessed in a continuous cycle coincident with the operation of the sheet molding apparatus thereby eliminating the storage and handling problem of the prior reprocessing method.

With the foregoing in mind, an object of the present invention is to provide a new and improved method and apparatus for efficient, effective and economical reprocessing of selvage waste formed when making plastic sheet material.

More specifically, the present invention provides a new and improved method and apparatus which reprocesses selvage waste formed when making plastic sheet material into a form suitable for reuse in plastic sheet molding apparatus.

A further object of the present invention is to provide a new and improved method for reprocessing selvage waste and apparatus for carrying out the method which is of comparatively simplified construction and may be manufactured economically.

A still further object of the present invention is to provide a method and apparatus for use with plastic sheet molding apparatus coincident with the operation of the sheet making apparatus to continuously reprocess selvage waste produced during making of sheet material and to commingle the reprocessed selvage with new pellets used in the molding apparatus for recycling the material therethrough.

Other objects of the present invention and the various details of the operation of the method of the present invention and the structural details and arrangement of the apparatus are set forth more fully hereinafter with reference to the accompanying drawings, in which:

FIG. 1 is a diagrammatic view partly in section illustrating schematically apparatus for making plastic sheet goods and apparatus of the present invention for reprocessing the selvages formed during making of the sheet;

FIG. 2 is an end elevational view showing the trimming of the sheet material and also the guide sheaves for directing the selvage bands to reprocessing apparatus in accordance with the present invention;

FIG. 3 is a fragmentary top elevational view of the reprocessing apparatus of the present invention;

FIG. 4 is a side elevational view partly in section of the reprocessing apparatus of the present invention;

FIG. 5 is an enlarged fragmentary view showing the delivery end of the selvage feed trough;

FIGS. 6, 7, and 8 are enlarged sectional views taken on lines 6—6, 7—7, and 8—8 respectively of FIG. 4;

FIG. 9 is a fragmentary view of the ribbon which the apparatus of the present invention forms of the selvage waste;

FIG. 10 is a fragmentary sectional view showing a modified form of the crimping gears;

FIG. 11 is a fragmentary transverse sectional view of the modified gears shown in FIG. 10;

FIG. 12 is a fragmentary view of the ribbon formed by apparatus incorporating the modified gears shown in FIGS. 10 and 11; and FIG. 13 is a sectional view taken on line 13—13 of FIG. 12.

With reference to the drawings and particularly FIG. 1 thereof, there is shown the components of a conventional system for making plastic sheet material and apparatus in accordance with the present invention for reprocessing the selvage waste formed during the sheet making process. The system includes a conventional molding apparatus 10 wherein plastic pellets supplied from a hopper 12 to an injection cylinder 14 are ejected in the form of sheet S through a nozzle 16 by a reciprocable ram 18. The sheet S passes around several intermediate rolls 19 to a take up roll 20 and the selvage edges of the sheet S are trimmed by a pair of spaced cutters 22 positioned along the path of travel of the sheet S. In the present instance the selvage bands B trimmed by the cutters are directed around a series of guide sheaves G to reprocessing apparatus in accordance with the present invention.

In accordance with the present invention, two or more selvage bands B are first gathered together to form an integrated strip of closely bunched selvage bands and thereafter the strip is crimped to form a unitary continuous corrugated ribbon R which then is cut into a plurality of small pellet-sized segments or units P of uniform size and shape and of substantially the same size as the new pellets used in the sheet molding apparatus. In the present instance, the reprocessing method is continuous whereby the selvage bands B are gathered, crimped and cut in the manner described above in timed relation with the operation of the sheet molding apparatus. Further the reprocessed segments P are continuously commingled with the new pellets supplied to the sheet making apparatus.

The structural details and arrangement of apparatus in accordance with the present invention for reprocessing the plastic selvage bands B are illustrated in FIGS. 3 and 4. Considering the apparatus in terms of function and with reference to the primary component elements and their respective functions, there is provided a trough generally designated by the numeral 30 having a restricted discharge or delivery section at one end through which the selvage bands are drawn whereby they are gathered into an integrated strip of closely bunched bands. The strip then passes into the bite of a pair of cooperating, rotatable crimping gears 32 and 34 which crimp and compact the strip of selvage bands into a unitary corrugated ribbon R. The crimping gears advance the corrugated ribbon R to a cutter 36 which operates in timed relation with the ribbon feed to cut the ribbon R into a plurality of pellet-sized segments or units P of uniform size and shape and of substantially the same size as new pellets used in the sheet making apparatus. In the present instance the segments P are delivered through a funnel-like chamber 40 which communicates with a main pellet supply tube 42 which empties into the hopper 12 whereby the reprocessed segments P are continuously commingled with new pellets being supplied to the hopper. (See FIG. 1.)

Considering the specific structural details of the primary components of the reprocessing apparatus, the trough 30 comprises a wedge shaped base 45 and upstanding side walls 46 on opposite sides of the base 45 which are coextensive with the base 45 and which project upwardly beyond the top surface 47 thereof to define a channel between the side walls 46 which converges toward the discharge or delivery end of the trough 30. The top surface 47 of the base 45 is parallel to and disposed above a plane A—A midway between the pitch circle of the gears (indicated in broken lines) at the bite of the gears and as shown in FIG. 4, the end of the block 45 at the discharge end of the trough 30 is provided with a delivery portion or chute 48 of arcuate cross section which curves downwardly from the top surface 47 and terminates adjacent the bite of the gears 32 and 34 in the plane A—A. Accordingly as the selvage bands B are drawn through the delivery chute 48, they are gathered or bunched together to form an integrated rope-like strip. Further as illustrated, the base 45 and side walls 46 are cut back from the tip of the chute 48 to conform to the contour of the gears. In the present instance the trough 30 is pivotally mounted at its entrance end on a post 50 and is supported adjacent the delivery end on a laterally extending arm 54 carried by a supporting post 56. The arm 54 includes spaced apart shoulders 55, 57 serving to limit lateral movement of the trough relative the arm 54 and a spring biased ball check 59 adapted to engage and retain the trough 30 in the solid line position during operation of the apparatus. By this arrangement the trough 30 may be pivoted between the solid and broken line positions indicated in FIG. 3 to facilitate initial feeding of the selvage bands B to the apparatus as discussed in greater detail hereinafter.

The crimping gears 32 and 34 pull the strip through the trough 30 and compact the strip into the corrugated ribbon R shown in FIG. 9. To this end, the crimping gears 32 and 34 are mounted for rotation on shafts 62 and 64 respectively connected through conventional transmission gears housed in a transmission box 66 to a drive shaft 68 which in turn is connected to suitable drive means such as a motor. Further, the gears are mounted to provide a clearance C between the meshing teeth at the bite of the gears. The specific mounting of the gears on their respective shafts is identical for both gears and as illustrated in FIG. 6 for the gear 32, includes a generally cylindrical collar 70 secured against rotational movement relative to the shaft by a conventional keyed connection as at 71. The collar 70 is externally threaded at its outer end as at 75 and has a radially outwardly projecting flange 72 at its inner end, the outer peripheral surface of which is tapered. The gear 32 is provided with a central opening 77 of a suitable diameter to fit the collar 70 and has an enlarged annular recess 79 in its inner face, the peripheral wall 81 of which is tapered to complement the tapered surface of the flange 72. The gear 32 is provided with an enlarged annular recess 82 in its outer face to accommodate a retaining ring 83. By this arrangement, the gears may be positioned on their respective collars to provide the desired clearance between the gear teeth at the bite as shown in FIG. 4 and then by turning the retaining ring 83 inwardly of the collar, the tapered peripheral wall 81 frictionally engages the tapered peripheral surface of the flange 72 to secure the gear against rotation relative to the collar. It is noted that the retaining ring has diametrically opposed recesses 80 in one face to facilitate turning thereof by a wrench. By this arrangement, the gears 32 and 34 are easily removed and when desired may be replaced readily with another set of gears to accommodate a greater number of selvage bands B or to change the characteristics of the ribbon R. For example, if a large number of selvage bands is being processed, suitable gears having a greater clearance C between their teeth at the bite of the gears are employed or if it is desired to vary the number of corrugations per inch of the ribbon R, gears having a predetermined circumferential spacing of the teeth are chosen to provide the desired corrugations per inch.

The crimping gears advance the corrugated ribbon R through a guide passageway 90 to the cutter 36. In the present instance, the passageway 90 is of generally rectangular cross section, the upper and lower walls of which are defined by confronting faces 91, 92 of block members 93 and 94 repsectively mounted on the side of the transmission box. The side wall of the transmission box between the faces 91 and 92 provides one side wall of the passageway and the side face 97 of a pivotally mounted pendulum 99 provides the opposite side wall of the passageway. The block members have arcuate side edge portions conforming to the curvature of the gear as shown in FIG. 11 which side edge portions are spaced closely to the periphery of the gears. By this arrangement the block membres strip the ribbon R from the gears in the event that it tends to cling to one of the gears and direct the ribbon R through the passageway 90. It is noted that the pendulum may be pivoted outwardly as indicated in FIG. 8 to permit insertion of the ribbon in the apparatus and also to permit access to the passageway 90 in case the ribbon R does become jammed.

The cutter 36 positioned adjacent the outer end of the passageway is, in the present instance, a circular saw blade 100 mounted between friction plates 101, 103 carried on a shaft 102 projecting from the forward end of the transmission box. The shaft 102 is connected by suitable gears to the drive shaft 68 to rotate the saw in a predetermined timed relation to the rate of ribbon feed. As illustrated for example in FIG. 8, the saw has a plurality of circumferentially spaced teeth 107 on its outer periphery, each cutting edge 109 of which is of a width slightly greater than the width of the passageway 90. The saw teeth 107 move in a circular path spaced closely to the outer end of the top face 92 of the lower block member 94 to cut the ribbon R into a plurality of small segments P. It is noted that the size of the segments P may be varied selectively by changing the rate of rotation of the circular saw 100 in relation to the linear movement of the ribbon along the passageway 90. Alternately for a given rotary speed of the saw, the size of the segments may be varied selectively by employing a saw having teeth which are spaced further apart circumferentially if it is deisred to increase the size of the segments or a saw having teeth spaced closer together circumferentially if it is desired to decrease the size of the segments.

With reference to FIG. 1, the operation of the reprocessing apparatus of the present invention in cooperation with the sheet molding apparatus is as follows. At the start of the operation, the trough 30 is pivoted to the broken line position shown in FIG. 3 and the pendulum 99 is raised to permit access to the passageway 90 from the side. The selvage bands B are then laid lengthwise of the trough 30 with the terminal ends projecting from the delivery end. The trough 30 is then swung to the operative position shown in solid lines to permit the selvage bands B to be manually positioned between crimping gears 32 and 34 with the free ends thereof disposed in the passageway. Thereafter the pendulum 99 is lowered and the apparatus is ready for automatic operation. Accordingly as the sheet material S is being continuously extruded, the crimping gears 32 and 34 are rotated at a predetermined rate to crimp and advance the ribbon R in timed relation with the operation of the sheet making apparatus. It is noted that as the selvage bands B are advanced through the trough 30, they are drawn downwardly over the curved tip portion at the delivery end of the trough through the restricted space between the side walls 46 whereby the selvage bands are gathered into an integrated strip of closely bunched selvage bands. Thereafter as the strip moves through the bite of the crimping gears, the gears serve to compact and crimp the strip into a unitary corrugated ribbon R. As the ribbon R leaves the bite of the gears, it is advanced along the upper face 92 of the lower block member 94 to the front edge thereof where the ribbon R is engaged by the teeth of the saw 100 and cut into a plurality of small segments P of uniform size and shape and of substantially the same size as the new pellets. The segments P then are directed through the funnel-like chamber 40 to the delivery tube 42 where they are mixed with new pellets and enter the hopper commingled with the new pellets.

A modified form of the crimping gears is illustrated in FIGS. 10 and 11 which is similar in arrangement and function to the gears 32 and 34 described above, except that the teeth of one of the gears, the lower gear 134, are provided with a V-notch 135 approximately centrally of each of the teeth whereby the ribbon R' formed by the gears has a continuous rib 136 on the underside thereof as shown for example in FIGS. 12 and 13. This arrangement minimizes the tendency of the ribbon R' to wrap itself on the lower gear and accordingly minimizes the chance of jamming the apparatus during operation.

From the foregoing it is apparent that the present invention provides a new and improved method and apparatus for reprocess selvage waste formed during the making of plastic sheet material which is extremely useful for the purposes intended and is much more economical than prior method for reclaiming this waste material.

While particular embodiments of the present invention have been illustrated and described herein, it is of course to be understood that changes and modifications of various parts of the apparatus and the manner and sequence of the method for reprocessing selvage waste may be made within the scope of the present invention and the following claims.

I claim:

1. A method of reprocessing selvage bands formed during the making of plastic sheet material consisting of the steps of gathering a plurality of selvage bands to form an integrated strip of closely bunched selvage bands, crimping the strip to form a unitary corrugated ribbon and cutting the ribbon into a plurality of small segments of substantially uniform size and shape.

2. A method of reprocessing selvage bands formed during the making of plastic sheet material consisting of the steps of gathering a plurality of selvage bands to form an integrated strip of closely bunched selvage bands, passing the strip through a pair of cooperating rotatable crimping gears to form a unitary corrugated ribbon, advancing the ribbon through a passageway and rotating a cutting saw disposed adjacent the end of the passageway in timed relation to the ribbon movement through the passageway to cut the ribbon into a plurality of small segments of substantially uniform size and shape.

3. A method for making plastic sheet material consisting of the steps of processing plastic pellets into a continuous sheet, trimming the selvage edges of the plastic sheet, continuously gathering the selvage edges to form an integrated strip of closely bunched selvage edges, crimping the strip to form a unitary corrugated ribbon, cutting the ribbon into a plurality of small segments of uniform size and shape and of substantially the same size as the plastic pellets and commingling the reprocessed segments with the plastic pellets for use in making the plastic sheet material.

4. In apparatus for reprocessing selvage bands formed during the making of plastic sheet material, means for gathering a plurality of selvage bands to form an integrated strip of closely bunched selvage bands, crimping means for compacting the strip into a unitary corrugated ribbon and operable to advance the ribbon along a predetermined path and a cutter along said path for cutting the ribbon into a plurality of small segments of substantially uniform size and shape.

5. In apparatus for reprocessing selvage bands formed during the making of plastic sheet material, a trough having a restricted delivery section at one end thereof through which the selvage bands are adapted to be drawn whereby they are gathered to form an integrated strip of closely bunched selvage bands, crimping means disposed adjacent the delivery end of said trough for compacting the strip into a unitary corrugated ribbon and operable to advance the ribbon along a predetermined path and a cutter along said path for cutting the ribbon into a plurality of small segments of substantially uniform size and shape.

6. In apparatus for reprocessing selvage bands formed during the making of plastic sheet material, a trough having a restricted delivery section at one end thereof through which the selvage bands are adapted to be drawn whereby they are gathered to form an integrated strip of closely bunched selvage bands, a pair of cooperating rotatable crimping gears adjacent the delivery section of said trough operable to compact the strip into a unitary corrugated ribbon as it passes through the bite of said gears, means to rotate said gears to advance the ribbon along a predetermined path and a cutter along said path for cutting the ribbon into a plurality of small segments of substantially uniform size and shape.

7. In apparatus for reprocessing selvage bands formed during the making of plastic sheet material, a trough including a wedge-shaped base having a top surface and upstanding side walls on opposite sides of the base projecting upwardly beyond the top surface of said base to define a channel between the side walls which converges toward the delivery end of the trough, a pair of cooperating rotatable crimping gears adjacent the delivery end of said trough, means to rotate said gears to draw the selvage bands through said trough whereby they are gathered to form an integrated strip of closely bunched selvage bands, said crimping gears operable to compact the strip into a unitary corrugated ribbon and advance the ribbon along a predetermined path and a cutter along said path for cutting the ribbon into a plurality of small segments of substantially uniform size and shape.

8. In apparatus for reprocessing selvage bands formed during the making of plastic sheet material, a trough including a wedge-shaped base having a top surface and upstanding side walls on opposite sides of the base projecting upwardly beyond the top surface of said base to define a channel between the side walls which converges toward one end of the trough, cooperating rotatable crimping gears disposed adjacent said one end of said trough, the base of said trough adjacent said one end having a delivery chute of arcuate cross section which curves downwardly from the top surface of said base and terminates adjacent the bite of said crimping gears in a plane midway of the pitch circle of said gears at the bite thereof, said crimping gears operable to pull the selvage bands through said delivery chute whereby they are gathered to form an integrated strip of closely bunched selvage bands and operable to compact the strip into a unitary corrugated ribbon, and a cutter operable to cut said ribbon into a plurality of small segments of substantially uniform size and shape.

9. In apparatus for reprocessing selvage bands formed during the making of plastic sheet material, means for gathering a plurality of selvage bands to form an integrated strip of closely bunched selvage bands, crimping means for compacting the strip into a unitary corrugated ribbon and operable to advance the ribbon at a predetermined linear rate along a path and a rotatable saw blade disposed along said path having a plurality of circumferentially spaced cutting teeth, and means for rotating said blade in timed relation to the rate of ribbon feed to cut the ribbon into a plurality of small segments of predetermined substantially uniform size and shape.

10. In apparatus for reprocessing selvage bands formed during the making of plastic sheet material, means for gathering a plurality of selvage bands to form an integrated strip of closely bunched selvage bands, a pair of cooperating rotatable crimping gears, means defining a V-notch approximately centrally of each of the teeth of one of said gears, means to rotate said gears to compact the strip into a unitary corrugated ribbon having a continuous rib projecting lengthwise of the ribbon and operable to advance said ribbon along a predetermined path and a cutter along said path for cutting the ribbon into a plurality of small segments of substantially uniform size and shape.

11. In apparatus for reprocessing selvage bands formed during the making of plastic sheet material, means for gathering a plurality of selvage bands to form an integrated strip of closely bunched selvage bands, a pair of cooperating rotatable crimping gears, means to rotate said gears to compact the strip into a unitary corrugated ribbon and to advance the ribbon through a passageway having confronting upper and lower walls and confronting side walls, said upper and lower walls being formed by spaced confronting faces of a pair of block members each having an arcuate side edge portion conforming to the contour of one of the gears and spaced closely thereto to guide the ribbon through said passageway and a cutter disposed at the outer end of said passageway for cutting the ribbon into a plurality of small segments of substantially uniform size and shape.

12. In apparatus as claimed in claim 11 including a pendulum forming one of the side walls of said passageway and which is pivotally mounted to permit access to the passageway from said one side.

13. In combination with apparatus for making plastic sheet material wherein plastic pellets are processed into a continuous plastic sheet and including means for trimming the selvage edges of said sheet, apparatus for reprocessing the selvage edges into a form suitable for reuse in said plastic sheet making apparatus comprising means for gathering said selvage edges to form an integrated strip of closely bunched selvage edges, crimping means for compacting the strip into a unitary corrugated ribbon and operable to advance the ribbon along a predetermined path, a cutter along said path for cutting the ribbon into a plurality of small segments of uniform size and shape and of substantially the same size as said plastic pellets, and means for commingling the said segments with said plastic pellets supplied to said sheet making apparatus.

References Cited by the Examiner
UNITED STATES PATENTS

| | | |
|---|---|---|
| 2,593,667 | 4/52 | Gora. |
| 2,704,860 | 3/55 | Russell. |
| 2,838,801 | 6/58 | De Long et al. |
| 2,862,350 | 12/58 | King et al. _____ 18—47.5 X |
| 2,995,775 | 8/61 | Schnitzius. |

ROBERT F. WHITE, *Primary Examiner.*

ALEXANDER H. BRODMERKEL, *Examiner.*